United States Patent
MacPherson

[15] 3,680,699
[45] Aug. 1, 1972

[54] METHOD OF WATER FILTRATION
[72] Inventor: Donald Reid MacPherson, Rocky Hill, N.J.
[73] Assignee: Johns-Manville Corporation, New York, N.Y.
[22] Filed: July 17, 1970
[21] Appl. No.: 55,852

[52] U.S. Cl. .................210/75, 210/80, 210/193, 210/503
[51] Int. Cl. .................................B01d 37/02
[58] Field of Search..........210/73, 75, 193, 290, 500, 210/503

[56] References Cited

UNITED STATES PATENTS

| | | | |
|---|---|---|---|
| 2,031,771 | 2/1936 | Jaenicke et al. | 210/193 X |
| 3,298,521 | 1/1967 | McKinlay | 210/75 |
| 3,382,983 | 5/1968 | Stewart | 210/290 X |
| 3,497,068 | 2/1970 | Hiash | 210/290 X |

*Primary Examiner*—John Adee
*Attorney*—John A. McKinney and Robert M. Krone

[57] ABSTRACT

Water is clarified by passage through a sand filter having a thin precoat layer of coarse, porous, granular material such as flux-calcined diatomaceous earth. The material in the precoat layer should be coarser than the top layer of sand in the sand filter, and preferably comprises 8 to 100 mesh particles. A body feed of coarse, porous, granular materials may be added to the water to be clarified if a substantial amount of colloidal or particulate material must be removed.

11 Claims, 1 Drawing Figure

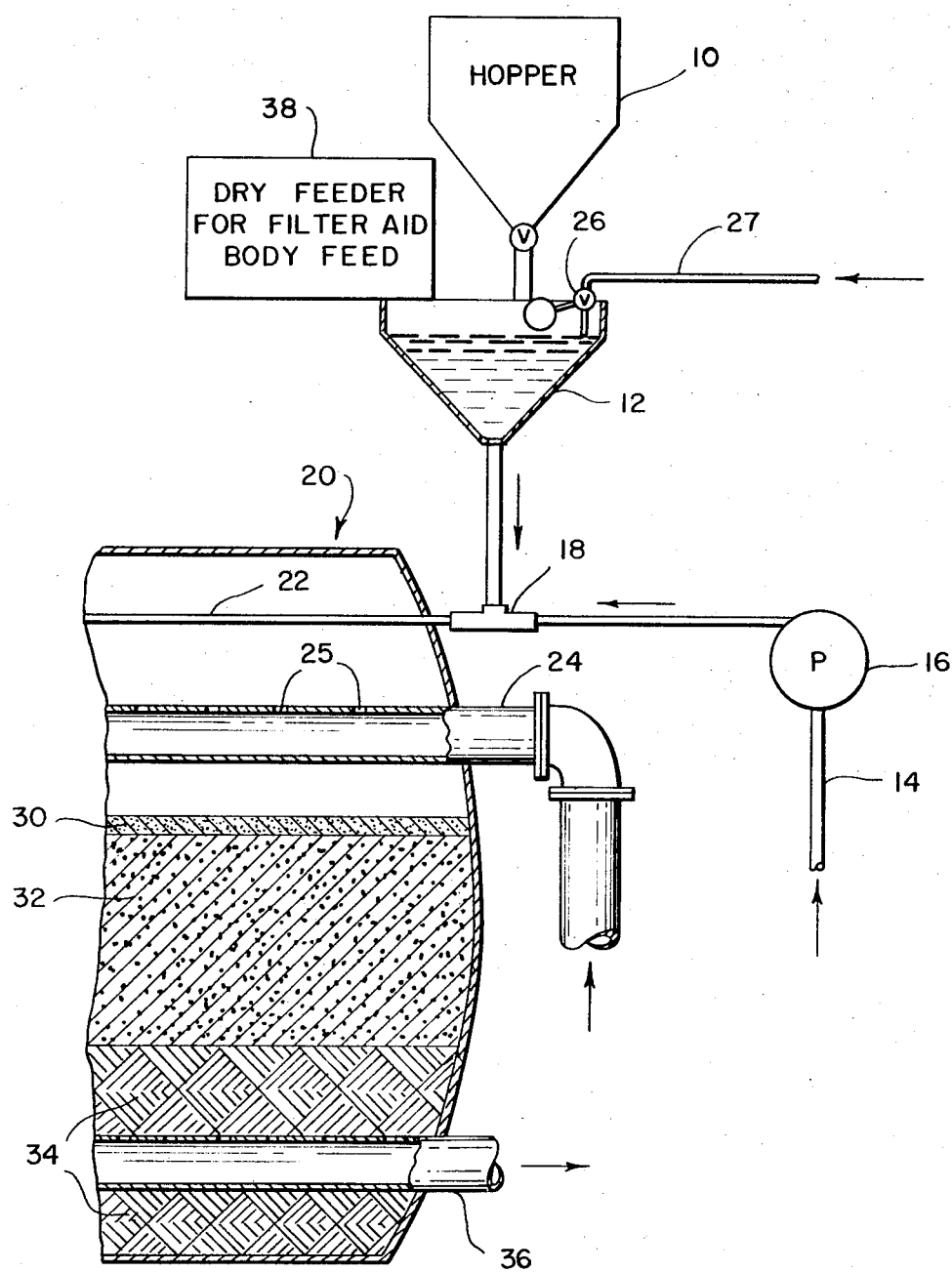

METHOD OF WATER FILTRATION

FIELD OF THE INVENTION

This invention relates to an improved process for removing particulate material from water. More particularly, the invention relates to a process for removing solid particles by passage of the water through a bed of granular filter medium, and to improved filter beds.

BACKGROUND OF THE INVENTION

Successful clarification of water and the removal of very fine solid particles with sand filters has proved to be difficult or impossible when the sand filters are used on untreated water due to the natural physical characteristics of the filter sand itself. The size of the filter sand particles is such that very small water-borne particles easily pass through openings between the sand grains. Usually, costly pretreatment facilities are necessary to increase turbidity particle size, and sedimentation basins are required to reduce filter loadings prior to introduction of water to sand filters.

While sand filters present numerous disadvantages, they have been widely employed, particularly in the treatment of municipal water supplies. The total dollar value of sand filter installations in the United States is enormous.

The World is experiencing a continual rampant increase in the demand for more and better water. This serious challenge has been brought about by the tremendous increase in population and industrial growth, as well as by constantly rising per capita water consumption. The required expansion of present water supply systems, and conservation in the form of reconditioning and reusing water, are important economic problems which must be solved rapidly. Because of the large number of relatively inefficient sand filter systems, and the need for more pure water, there is a pressing need for methods to upgrade the performance of existing sand filter systems.

It has been known in the filtration art for some time that diatomaceous earth is well suited for filtering out extremely minute particles from water. Diatomaceous earth is comprised of extremely tiny fossil-like skeletons of microscopic water plants called diatoms. Each skeleton is an extremely porous framework of nearly pure silica. The skeletons commonly have dimensions from about 5 to 100 microns and come in a diversity of shapes.

The deposition of a layer of fine diatomite directly upon the surface of a sand or similar coarse filter bed has been proposed as a method of improving the performance of a sand filter. However, the deposition of this fine material has not proved to be satisfactory because of the tendency of the fine diatomite to penetrate into the bed. Another problem has been the tendency of the diatomite to pile up around the edges or center of the filter bed and leave large exposed areas of sand which permit rapid passage of extremely fine particles carried by the water to be clarified.

Even when it has been possible to physically deposit a uniform layer of fine diatomite materials on a sand filter bed, the performance of the resulting filter bed has not been satisfactory. When a fine diatomaceous earth filter aid is used as a light coating on a sand filter, the filter rapidly builds up a high pressure differential across the sand bed until the filter cycle has to be stopped. The excessive pressure buildup can occur as soon as an hour after the filter cycle starts. The short on-stream performance of such filter beds coated with a fine filter aid makes their operation extremely expensive and uneconomical, except where water cost is not important but water purity is.

A filter bed including a bottom sand layer of a given thickness and a top layer of coarse granular porous material of about the same thickness has been experimentally tested. However, this concept was not tested on an operational scale. Serious questions arise as to the commercial utility of such a two-layer bed since it appears that backwash operations for such a bed would have to be conducted in a manner to prevent loss of material from the top layer, and to prevent intermixing of the top and bottom layers. Because of the relatively large amount of material required in the top layer, the loss of a significant proportion of the material from the top layer would make the process expensive. Similarly, it is not seen how repeated backwashing operations could be conducted at the usual backwash flow rates and pressure drops without intermixing of the layers and a consequent undesirable lowering of filter cycle time lengths and throughput.

Thus, a need remains for an improved process for clarifying water utilizing existing sand filters.

OBJECTS OF THE INVENTION

It is an object of this invention to provide a process for clarifying water using a sand filter which permits use of higher filtration rates and results in improved water quality.

Another object of the invention is to provide a filter bed which provides higher filtration rates, greater allowable pressure differentials, and longer on-stream operating periods then a standard sand filter bed, with all these desirable aspects being achieved without breakthrough.

Yet another object of the present invention is to provide a water clarification process using a pressure sand filter which permits the use of increased pressure differentials.

Other objects will be apparent to those skilled in the art from the description which follows, or will become apparent upon the practice of the invention.

SUMMARY OF THE INVENTION

The invention provides an improved process for water clarification. A precoat layer containing less than 0.25 pounds of porous granular material per square foot is deposited on the top surface of a sand filter. The porous granular material in the precoat layer is selected to consist essentially of particles larger than the effective size of the sand in the sand filter. The water to be clarified is passed through the precoat layer of porous granular material, and subsequently through the sand filter.

When the water to be clarified contains a substantial amount of colloidal solids, a body feed of porous coarse granular material is added to the water to be clarified prior to its passage through the precoat layer. The body feed material, when utilized, also consists essentially of particles larger than the effective size of the sand in the sand filter layer.

Preferably, the sand filter is backwashed when the pressure differential across the filter becomes excessive and the sand filter is then again coated with a precoat layer of less than 0.25 pounds of filter aid per square foot of filter area before resuming filtration operations.

The invention also provides an improved filter bed for clarifying water. The new filter bed comprises a lower layer of sand and a precoat layer comprising less than 0.25 pounds of coarse porous granular material per square foot of filter bed. The precoat layer is positioned on top of the layer of sand, and the particles of the precoat layer are larger than the effective size of the sand in the layer of sand.

The invention provides a method and apparatus for increasing the throughput and the length of the operating cycles for sand filters. Surprisingly, these desirable results are also accompanied by an increase in the quality of effluent leaving the filter. The invention, thus, is capable of upgrading the performance of the numerous sand filters in operation today.

DESCRIPTION OF THE DRAWING

The drawing is a schematic diagram of an embodiment of the filter bed of this invention, and also illustrates a feeding system for horizontal sand filters that can be utilized in the process of the invention.

DETAILED DESCRIPTION OF PREFERRED EMBODIMENTS OF THE INVENTION

In accordance with the process of the invention, a thin precoat layer of porous granular material is deposited on the top surface of a sand filter. The sand filter can be a pressure sand filter, or an open (gravity) filter. In either type of filter, the turbid water is pumped over the top of the filter bed. The water percolates through the bed and clear water is drawn from the bottom of the bed while the solids are retained on the bed.

The filter sand utilized in the filter bed can extend over a wide range of particle sizes. The American Water Works Association classifies filter sand on a variety of bases, with one basis being effective size. The effective size of a sample is defined as that size such that ten percent of the sample is finer than the effective size. Thus, in a filter sand having an effective size of 0.45 mm., ten percent of the sand particles are finer than 0.45 mm. In this specification and the attached claims, the term "effective size" is used in accordance with the American Water Works Association's standards.

In general, during backwash operations, the finest grains of sand are pushed upwards and reach the top surface zone of the filtering layer. Thus, the size of the particles in the top surface zone of a filter bed which has been repeatedly backwashed, reflects the effective size of the filter sand.

The grade of sand to be used in the practice of this invention can include fine sand having effective sizes of from 0.35 to 0.45 mm., medium sand having effective sizes of 0.45 to 0.55 mm., and coarse sand having an effective size of 0.55 mm. or larger. The selection of the appropriate sand size is not an important feature of the present invention, because the sand acts more as a septum, rather than as a filtering medium in the process and a filter bed of this invention.

It is an important feature of the present invention that the particles of the thin precoat layer of porous, granular material are selected to be coarser than the effective size of the filter sand. It is essential that the pores or voids between the sand grains, and the interstices between the sand grains and the filter aid do not become filled or plugged with fine material from the filter aid, or the particulate matter in the water being filtered. When a fine filter aid is used in accordance with this invention, the void spaces become rapidly plugged as evidenced by the rapid formation of a high pressure differential across the filter bed. This extensive pressure buildup can occur within one half hour after the start of a filter cycle across a filter bed having a precoat of fine material.

It is necessary to achieve the objects and advantages of this invention that the precoat layer be formed of porous granules that are substantially all at least as large as the effective size of the filter sand. Preferably, the porous granules are selected to be larger than the effective size of the filter sand. Usually the size of the particles of porous granular material will be of the order of 8–100 mesh, where the filter aid contains particles predominately on the coarse side; that is, a product that contains only a few percent of fine particles.

A number of coarse, highly porous materials can be used as the filter aid to form the filter layer. The filter aid preferably resists size degradation during solids handling procedures and the deposition of the precoat layer on the sand filter. Typical examples of suitable filter aids include flux-calcined diatomaceous earth, calcined rice hull ash, light weight expanded clay aggregates, Kansas ash, pumice, and also natural diatomaceous earth if it is handled carefully to avoid granule degradation.

Flux-calcined diatomaceous earth is diatomaceous earth which has been heated at high temperatures, such as 2,000° F, in the presence of soda ash. The resulting material is significantly more abrasion resistant than natural diatomaceous earth. Also, the flux-calcination tends to increase the average particle size because of the tendency of the particles to agglomerate.

Because the porous granular material usually has a low density, large amounts of the granular material are backwashed out of the filter bed. Thus, for economical operation of the process, it is desirable to limit the amount of filter aid deposited in the precoat layer to no more than 0.25 pounds per square feet. As little as 0.10 pounds per square feet is frequently sufficient to provide the benefits of the invention.

Frequently, when the water being filtered contains a large quantity of colloidal solids or fine particulate material, it is desirable to provide a body feed of coarse porous granular material. The body feed which comprises filter aid added to the water to be filtered prevents fine colloidal turbidity from plugging the minute openings in the precoat. Body feed maintains the porosity of the filter cake by providing a continuously fresh supply of microscopic flow channels. The use of body feed is usually necessary to achieve long economical filtering cycles when treating raw water.

The body feed materials can be selected from the same materials used to form the precoat, and the criteria used in selecting the size of the body feed particles are also the same as described above for the precoat. The nature and amount of solids govern the ratio of body feed to turbidity. Usually, a body feed to turbidity ratio of about 2–4 to 1 on a weight basis is used. Thus, the total filter aid used in a process in which body feed is utilized usually ranges from 0.05 to 0.30 lb/1,000 gal. of throughput.

For a clearer understanding of the invention, specific examples of it are set forth below. These examples are illustrative and are not to be understood as limiting the scope and underlying principles of the invention in any way. All percentages listed in the specification and claims are weight percentages unless otherwise noted. All screen sizes referred to in the specification and claims are U. S. Standard Series, unless otherwise noted.

EXAMPLES 1–3

Turbid water containing ferric hydroxide is filtered through a pressure sand filter using the techniques and apparatus illustrated in the drawing. At the start of the filter cycle, a precoat hopper 10 is filled with a predetermined quantity of filter aid and the filter aid is fed into a flooded funnel 12. A portion of the influent water is sent through a pipe 14 to a booster pump 16 which boosts the water pressure up to about 90 psi. The water from the pump (about 30–50 gallons per minute) is sent through a suitable eductor 18 and then into a pressure sand filter generally 20. The velocity of the water from pump 16 through the eductor 18 creates a vacuum at the top opening of the eductor which causes the water and filter aid material from flooded funnel 12 to be drawn into a header pipe 22.

Header pipe 22 is used to distribute the coarse filter aid throughout the surface area of the sand filter bed, because the velocity of flow in the main header 24 is usually too low to keep the filter aid in suspension. Holes of ⅝ inch diameter (not shown) are provided on the top of header 22 about 10 inches apart throughout the length of the header which extends the length of filter 20, and a ⅝ inch hole is provided at the end of the header. This arrangement insures uniform distribution of the coarse filter aid on the surface of the sand.

During filtration, the raw influent passes through header 24 and out through holes 25 (about 1 inch in diameter) in the top of the header. Water is forced under pressure of about 60 psi through precoat layer 30 and sand filter layer 32 to remove solids from the influent water. The sand in layer 32 is considerably finer than AAWU standard fine sand because of repeated backwashing over a number of years. The clarified water passes through a gravel bed 34 and is removed from filter 20 through effluent header 36.

The filter aid for the body feed is provided by a dry feeder 38 which supplies filter aid at a predetermined rate to flooded funnel 12. Conventional fittings (not shown) are provided to backwash the pressure sand filter 20.

In the installation shown in the drawing, it is desired to lower the iron content of the effluent from filter 20 to no more than 0.3 ppm from the approximately 3.1–3.5 ppm level at which it enters header 24. Table I below compares the cycle lengths and total throughput that are achieved using an ordinary sand filter with the results obtained when the same sand filter is coated with a porous granular material in accordance with the invention.

TABLE I

| Example | Filter Rate (gpm) | Total Iron (ppm) Inf. avg. | Total Iron (ppm) Eff. end of test | Cycle Length Hour | Throughout gallons |
|---|---|---|---|---|---|
| 1 | 244 | 3.5 | 0.3 | 11.25 | 165,000 |
| 2 | 305 | 3.1 | 0.3 | 15.65 | 296,000 |
| 3 | 361 | 3.4 | 0.3 | 3 | 65,000 |

In the procedure of Examples 1 and 2, the sand filter is coated with 0.17 lb. of flux calcined diatomaceous earth per 1,000 gallons of water, about half the filter aid is supplied as a precoat and about half as a body feed. In Example 1, the filter aid has a particle size of from 20–60 mesh, as defined in A.S.T.M.E. 11, and in Example 2, the filter aid varies in size from 30–60 mesh.

The results of Examples 1 and 2 in which the invention produces 300–500 percent increases in cycle length and throughput compared to the prior art sand filter of Example 3 are typical of the dramatically improved results which are obtained by practice of the invention.

EXAMPLES 4–7

Two pressure sand filtration columns (4¾ inches inside diameter, clear heavy-wall Lucite) are set up so that both can be run in parallel. Twenty-six inches of filter sand are placed in each column. This sand contains about 60 percent by weight of 20–30 mesh particles and about 40 percent by weight of 30–50 mesh particles.

A high-pressure, six-stage Moyno pump system dispenses a body feed of flux-calcined diatomaceous earth with a portion of the influent into the sand bed.

The flow rates through the sand filters are measured with Hagan ring-balance meters. The pressure differentials across each of the sand filters are indicated with a conventional 24-hour recording Foxboro pressure meter placed across the influent and effluent lines for each filter.

In all tests, a filter aid is used in conjunction with one of the sand filters, and the other plain sand filter is run in parallel under identical conditions. Periodically, both sand filters are used for blank runs to determine that each filter is behaving in a similar manner.

The filter aid utilized in Examples 4–7 is a flux-calcined diatomaceous earth sold by Johns-Manville Corporation under the trademark "CELITE" and having particles in the size ranges listed in Table II below.

TABLE II

Gain in Water Throughput with Granular Precoat for Parallel pressure Sand Filters Using Coarse, Flux calcined Diatomaceous Earth as Precoat and Body Feed at Constant Filter Rate of 12 gsfm

| | Raw raritan River water | | | Alum Flocculated water |
|---|---|---|---|---|
| Example | 4 | 5 | 6 | 7 |
| Column Designation | | | | |
| A | Sand | Sand | Celite | Celite |
| B | Celite | Celite | Sand | Sand |
| Celite Filter Aid Used | 30/45 | 30/45 | 30/45 | 30/45 |
| Influent Pressure psi | 40 | 40 | 80 | 80 |

| | | | | |
|---|---|---|---|---|
| Turbidity ppm(1) | 5–7 | 3–7 | 2–5 | 0.5–2 |
| Length Running hr. | | | | |
| To Breakthrough sand(2) | 6.5 | 6.5 | 6.0 | 3.6 |
| Total | 23.2 | 16.5 | 16.0 | 9.6 |
| Diatomaceous Earth Used | | | | |
| Precoat lb/s.f. | 0.54 | 0.54 | 0.18 | 0.18 |
| Body Feed lb/s.f. | 2.08 | 1.24 | 0.84 | 0.18 |
| Total per 1000 gal. | 0.157 | 0.149 | 0.091 | 0.052 |
| Throughput G.S.F. | | | | |
| Sand up to Breakthrough | 4650 | 4650 | 4310 | 2590 |
| Diatomaceous Earth | 16,700 | 11,900 | 11,500 | 6,910(3) |

(1) Measured with Hellige turbidimeter. Water quality of effluent as measured by turbidity through column including filter aid was 50–100% better than that through sand.
(2) Pressure differentials at breakthrough varied from 0 to 3.0 psi.
(3) This test could have been continued much longer than 9.6 hours.

The results of Table II show the significant increase in throughput that can be achieved by the invention while actually producing an increase in water quality.

EXAMPLE 8

The procedure of Example 4 is repeated using as a filter aid a calcined rice hull ash having about the same size distribution as the filter aid utilized in Example 4. This rice hull ash is screened from a product commercially sold by the Beagle Products Company as a floor-sweeping compound. The rice hull ash performs about as well as the flux-calcined diatomaceous earth of equivalent fraction size with respect to length of operating cycle, water quality and back pressure buildup on both raw river water and alum-flocculated water.

What I claim is:

1. An improved process for water clarification comprising: depositing a precoat layer containing less than 0.25 pounds of porous granular material per square foot on the top surface of a sand filter, the porous granular material in the precoat layer selected to consist essentially of particles larger than the effective size of the sand in the sand filter; and passing the water to be clarified through the precoat layer of porous granular material, and subsequently through the sand filter.

2. The process of claim 1 in which the porous granular material is flux-calcined diatomaceous earth which will pass an 8 mesh screen and be retained on a 100 mesh screen.

3. The process of claim 1 in which a body feed of porous coarse granular material is added to the water to be clarified prior to its passage through the precoat layer, the body feed material consisting essentially of particles larger than the effective size of the sand in the sand filter.

4. The process of claim 3 in which the porous granular material used in the precoat layer and in the body feed is flux-calcined diatomaceous earth which will pass an 8 mesh screen.

5. The process of claim 3 in which the total amount of coarse granular material present in the precoat layer and added as body feed is from 0.05 to 0.30 pounds per 1,000 gallons of water processed.

6. An improved process for clarifying water comprising: coating a sand filter with a precoat layer of less than 0.25 pounds of filter aid per square foot of filter area, the filter aid comprising a coarse porous granular material consisting essentially of particles larger than the effective size of the sand in the sand filter, passing water through the precoat layer and the sand filter to clarify the water; backwashing the sand filter when the pressure differential across the filter becomes excessive, and again coating the sand filter with a precoat layer of less than 0.25 pounds of filter aid per square foot of filter area.

7. The process of claim 6 in which a body feed of porous coarse granular material is added to the water to be clarified prior to its passage through the precoat layer, the body feed material consisting essentially of particles larger than the effective size of the sand in the sand filter.

8. The process of claim 7 in which the porous granular material used in the precoat layer and in the body feed is flux-calcined 8–100 mesh diatomaceous earth.

9. The process of claim 7 in which the total amount of coarse granular material present in the precoat layer and added in body feed is from 0.05 to 0.30 pounds per 1,000 gallons of water processed.

10. An improved filter bed for clarifying water comprising: a lower layer of sand and a precoat layer comprising less than 0.25 pounds of coarse porous granular material per square foot of filter bed, said precoat layer positioned on top of said layer of sand, the particles of the precoat layer being larger than the effective size of the sand in the said layer of sand.

11. The filter bed of claim 10 in which the precoat layer consists essentially of flux-calcined diatomaceous earth which will pass an 8 mesh screen.

* * * * *